United States Patent [19]
Antonette

[11] Patent Number: 6,082,797
[45] Date of Patent: Jul. 4, 2000

[54] GRIPPING TOOL ASSEMBLY

[75] Inventor: William B. Antonette, Fraser, Mich.

[73] Assignee: FANUC Robotics North America, Inc., Rochester Hills, Mich.

[21] Appl. No.: 09/184,366

[22] Filed: Nov. 2, 1998

[51] Int. Cl.[7] ............................................. B66F 9/18
[52] U.S. Cl. .................................. 294/103.1; 294/119.1; 414/741; 901/39
[58] Field of Search .......................... 294/103.1, 119.1, 294/67.22; 414/659, 280, 704, 741; 901/39

[56] References Cited

U.S. PATENT DOCUMENTS

| | | |
|---|---|---|
| 1,843,736 | 2/1932 | Remde . |
| 2,590,355 | 3/1952 | Turner et al. . |
| 2,682,347 | 6/1954 | Jackson . |
| 2,727,643 | 12/1955 | Maginn et al. ......................... 414/659 |
| 2,782,065 | 2/1957 | Lord ..................................... 294/119.1 |
| 3,157,301 | 11/1964 | McWilliams ............................ 414/659 |
| 3,888,360 | 6/1975 | Ando et al. . |
| 3,977,550 | 8/1976 | Crawford et al. ...................... 414/659 |
| 4,012,830 | 3/1977 | Ewertowski . |
| 4,116,349 | 9/1978 | Durham .............................. 294/67.22 |
| 4,256,429 | 3/1981 | Dwyer ................................. 294/103.1 |
| 4,395,190 | 7/1983 | Barchard . |
| 4,652,204 | 3/1987 | Arnett . |
| 4,696,501 | 9/1987 | Webb . |
| 4,808,058 | 2/1989 | Carney et al. .......................... 414/280 |
| 5,391,050 | 2/1995 | Gatteschi ............................. 294/119.1 |
| 5,468,116 | 11/1995 | Reichert et al. ....................... 414/659 |
| 5,509,774 | 4/1996 | Yoo . |

*Primary Examiner*—Dean J. Kramer
*Assistant Examiner*—Paul T. Chin
*Attorney, Agent, or Firm*—Howard & Howard

[57] ABSTRACT

A gripping tool assembly disposed on the wrist section of a robot for gripping and moving various objects between a pick-up zone and a drop-off zone. The gripping tool assembly includes a frame having a top portion and a bottom portion with a pair of parallel lift arms secured to the bottom portion of the frame and projecting outwardly from the frame for supporting the object. A clamp is movably mounted to the frame for vertical movement between the top and bottom portions relative to the lift arms to sandwich the object between the clamp and the lift arms. The gripping tool assembly is characterized by a pusher movably mounted to the frame along a hollow tine. The pusher is mounted to a lead screw disposed within the tine wherein the lead screw horizontally moves the pusher relative to the lift arms for pushing the object toward the distal ends of the lift arms.

22 Claims, 4 Drawing Sheets

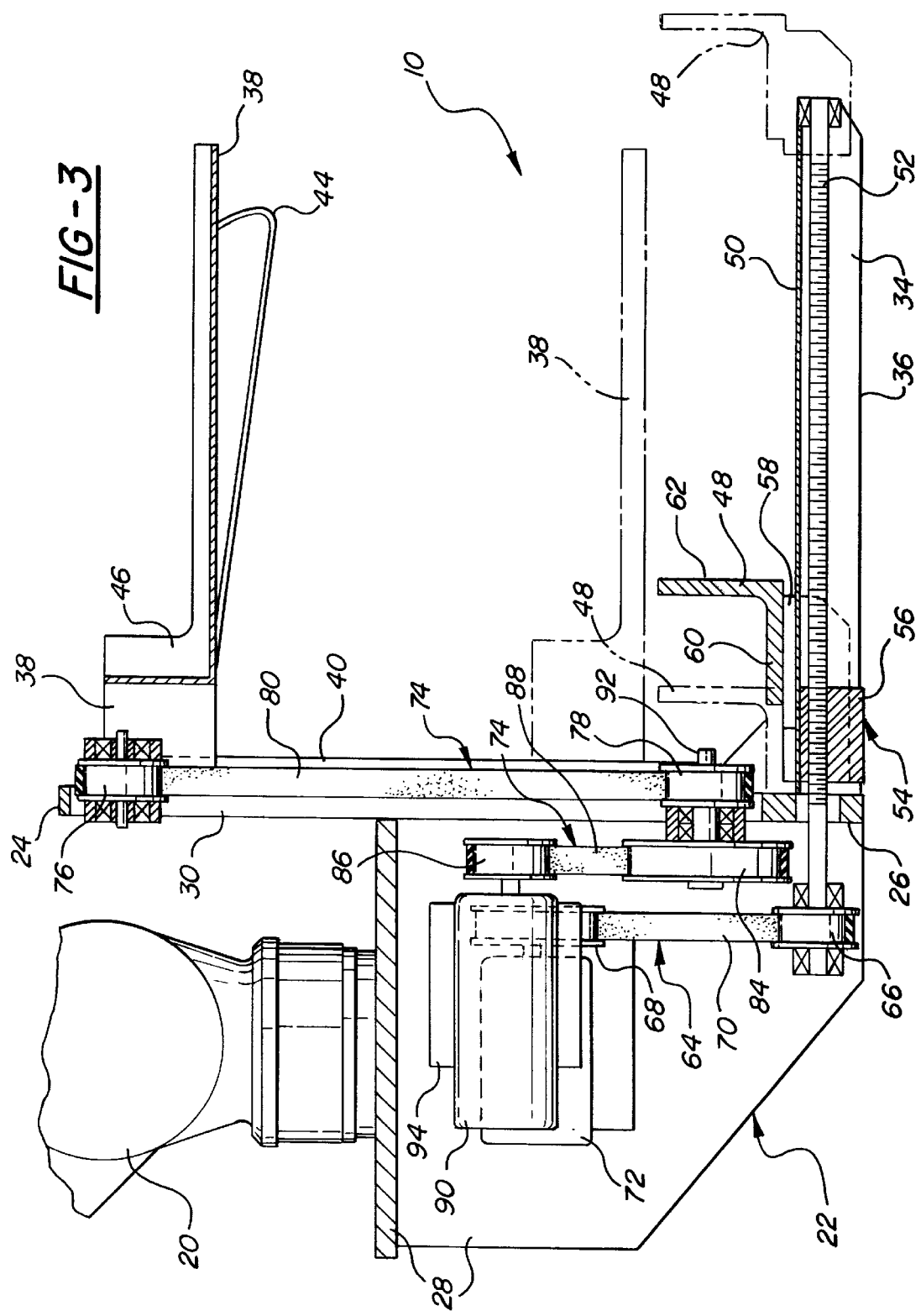

GRIPPING TOOL ASSEMBLY

BACKGROUND OF THE INVENTION

1) Technical Field

The subject invention relates to a gripping tool disposed on a robot manipulator for gripping and moving various objects between desired locations.

2) Description of the Prior Art

Robot manipulators are frequently used in modern manufacturing plants and distribution centers for accomplishing such tasks as material handling, machine loading and unloading, parts transfer, manufacturing assembly, waterjet cutting, die casting, dispensing, welding, painting, and material removal. These robots usually have a rotatable base with a manipulating arm. The arm includes a shoulder section, elbow section and a wrist section. A tool is typically mounted to the wrist section for performing a desired operation. The tool may be any type of suitable device such as needed to perform the operation. Gripping tools are commonly used for clasping, lifting, holding, placing and transporting objects from one point to another.

A common type of gripping tool typically has a lift arm which projects outwardly to support and lift the object. Clamps are often provided to sandwich the object between the clamp and the lift arm to hold the object to the gripper. One such example of a gripping tool is disclosed in U.S. Pat. No. 4,696,501 to Webb. A deficiency encountered with the prior art grippers relates to releasing the object from the gripper tool. To release the object, the clamp lifts upwardly and then the gripping tool must be angled downwardly to have the object fall or slide off of the lift arms. The object falls off solely due to the force of gravity. This creates an unstable environment wherein the object may be positioned incorrectly or damaged. In addition, there may be instances where the robot has limited space and cannot manipulate the gripper tool effectively to unload the object. Finally, the programming of the robot is more complex and requires additional set up time to add the additional movements of the gripper tool. Hence, it is desirable to have a pusher type device on a robot gripper tool for pushing the object off of the lift arm and onto a desired location.

As disclosed in U.S. Pat. No. 4,395,190 to Barchard, the prior art has contemplated the use of a pusher device on a fork lift truck for pushing an object off of a pair of lift arms. This assembly, however, does not have a clamp device for holding the object in place during transport. In addition, the pusher and lift arms are not manipulatable and could not be used on a robot gripping tool.

SUMMARY OF THE INVENTION AND ADVANTAGES

A gripping tool assembly for gripping and moving objects. The assembly comprises a frame having a top portion and a bottom portion with at least one lift arm having a first end secured to the bottom portion of the frame and a second end projecting outwardly from the frame for supporting the object. A clamp is movably mounted to the frame for vertical movement between the top and bottom portions relative to the lift arm to sandwich the object between the clamp and the lift arm. The assembly is characterized by a pusher movably mounted to the frame for horizontal movement relative to the lift arm to push the object toward the second end of the lift arm.

Accordingly, the subject invention provides a robot gripping tool which can clamp and hold an object, transport the object, and then unload the object without downward manipulation of the gripper. In other words, the pusher will push the object off of the lift arms to the desired location. In addition, the lift arm and frame can retract while the pusher simultaneously advances toward the second end of the lift arm thereby causing the object to drop vertically. The pusher can also assist is holding the object on the lift arm by pressing up against the lower portion of the object. The pusher and clamp can be programmed to move in conjunction with each other thereby increasing the efficiency of the loading and unloading operations.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a partially cross-sectional view taken along line 3—3 of FIG. 2;

FIG. 4 is a partially cross-sectional front view of the gripping tool assembly.

DETAILED DESCRIPTION OF THE PREFERRED EMBODIMENT

Figure 1:
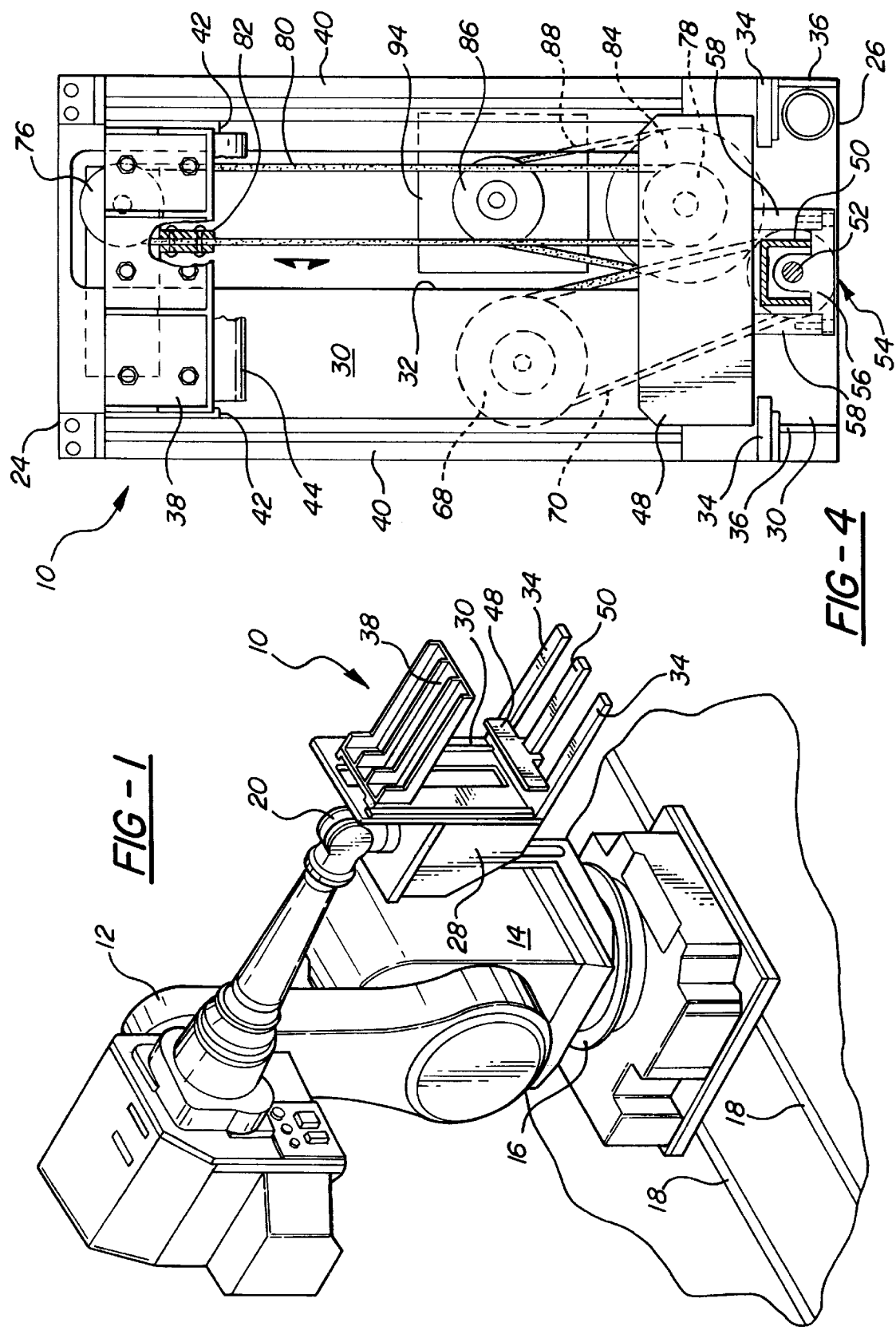
FIG. 1 is a perspective view of a robot manipulator incorporating a gripping tool assembly of the subject invention.

Referring to the Figures, wherein like numerals indicate like or corresponding parts throughout the several views, a gripping tool assembly for gripping and moving objects (not shown) is generally shown at 10. Referring to FIG. 1, the gripping tool assembly 10 is mounted to a manipulator arm 12 of a mechanical robot 14. The robot 14 has a rotatable base 16 which can move longitudinally along a track 18. The track 18 moves the robot 14 along a predetermined pathway. The manipulator arm 12 extends from the robot 14 and can be moved in a variety of ways. The gripping tool assembly 10 is specifically mounted to a wrist section 20 of the robot arm 12. This type of robot 14 is manufactured by and can be obtained from Fanuc Robotics North America of Rochester Hills, Mich. As appreciated, the gripping tool 10 of the subject invention could be mounted to any suitable type of robot manipulator or any other type of manipulating device. As discussed in the background section, gripping tools are generally used for clasping, lifting, holding, placing and transporting objects from one point to another.

The object in which the gripping tool assembly 10 of the subject invention moves can be any type of transportable device within the design parameters of the particular robot 14 and gripper 10. In fact, the gripping tool assembly 10 can be sized appropriately to grip larger or smaller objects. As shown, the gripping tool assembly 10 is designed to manipulate boxes or crates (not shown). More specifically, the robot 14 and gripping tool assembly 10 can be programmed to operate in a distribution center wherein the gripping tool 10 repeatedly transfers boxes from a pick-up zone to a drop-off zone. As will be better appreciated from the foregoing description, the gripping tool assembly 10 can be used to manipulate virtually any sized object in any type of environment.

Figure 2:
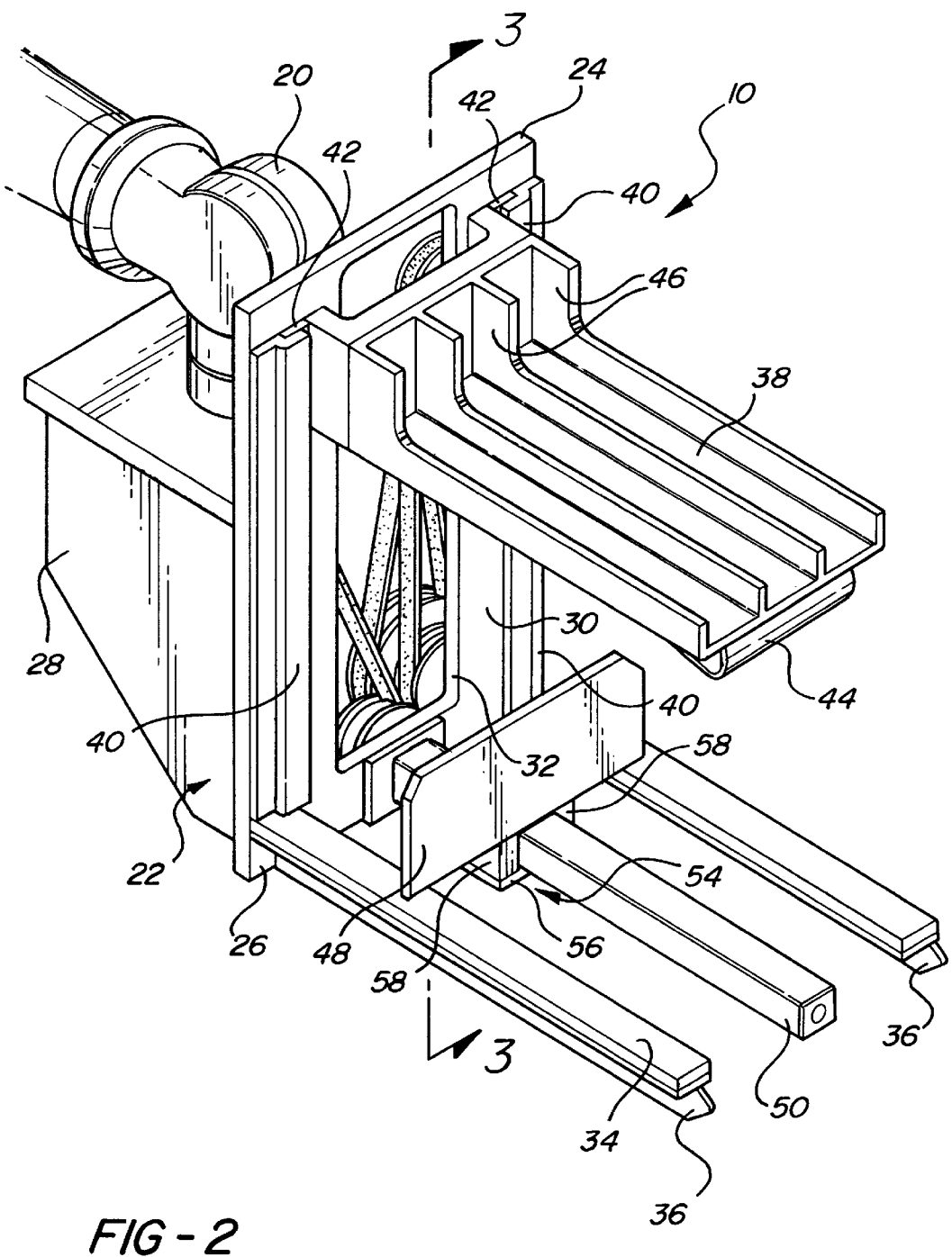
FIG. 2 is an enlarged perspective view of the gripping tool assembly.

Referring also to FIGS. 2, 3 and 4, the gripping tool assembly 10 is shown in greater detail. The gripping tool assembly 10 comprises a frame, generally shown at 22, having a top portion 24 and a bottom portion 26. The frame 22 includes a housing 28 for storing and concealing many internal components as are discussed below. The wrist section 20 of the robot 14 mounts to the housing 28 such that movement of the wrist 20 manipulates the gripping tool assembly 10 as desired. The frame 22 also includes a back panel 30 mounted to the housing 28. The back panel 30 extends between and forms the top 24 and bottom 26 portions of the frame 22. An access opening 32 is formed within the back panel 30 to provide access to the internal components of the housing 28.

At least one lift arm 34 extends from the back panel 30 of the frame 22. Specifically, the lift arm 34 has a first end secured to the bottom portion 26 of the frame 22 and a second end projecting outwardly from the frame 22 for supporting the object. Preferably, a pair of lift arms 34 extend outwardly from the bottom portion 26 of the frame 22. Even more preferably, the lift arms 34 extend parallel to each other. As appreciated, the size of the lift arm, or lift arms, will depend upon the particular application for the gripping tool assembly 10. It may be desirable to have a single relatively wide lift arm, or a pair of lift arms 34 (as shown), or even three or four thinner lift arms. The lift arms 34 as disclosed have a flat top surfaces with downwardly projecting plate like members 36. The plate like members 36 extend along the entire length of the lift arms 34 and align with the bottom of the back panel 30. The plate like members 36 create a uniform bottom surface for the gripping tool 10 which reduces the likelihood of snagging or damaging the object during the movement of the tool 10. The plate like members 36 also extend beyond the lift arms 34 and taper inwardly to a point for facilitating easier insertion and removal of the gripping tool 10 from within or under the object.

A clamp 38 is movably mounted to the frame 22 for vertical movement between the top 24 and bottom 26 portions relative to the lift arm 34 to sandwich the object between the clamp 38 and the lift arm 34. The upper extreme position (solid lines) and lower extreme position (phantom lines) of the clamp 38 are shown in FIG. 3. The clamp 38 provides the primary means of securing the object to the gripping tool 10. As best shown in FIG. 2, channels 40 are mounted to the back panel 30 of the frame 22 for vertically guiding the clamp 38 upwardly and downwardly between the top 24 and bottom 26 portions of the frame 22. The clamp 38 has a set of guides 42 which ride within the corresponding channel 40 as the clamp 38 moves upward and downward. The channels 40 and guides 42 may be substituted by any suitable track device without deviating from the overall scope of the subject invention.

Preferably, the clamp 38 is a substantially rectangular plate with a mashing plate 44 for assisting in gripping the object when the object is sandwiched between the clamp 38 and the lift arm 34. A number of structural ribs 46 are also provided on the clamp 38 to increase the rigidity of the clamp 38. As appreciated, the clamp 38 may be of any suitable design or configuration so long as the object can be adequately retained on the gripping tool 10 during the manipulation of the robot 14. The clamp 38 may certainly be modified from the design shown to accommodate different types and sized objects. The clamp 38 shown in the Figures works particularly well when grasping the boxes as discussed above.

The gripping tool assembly 10 is characterized by a pusher 48 movably mounted to the frame 22 for horizontal movement relative to the lift arm 34 to push the object toward the second end of the lift arm 34. The extreme positions (phantom lines) of the pusher 48 are shown in FIG. 3. A hollow tine 50 has a first end secured to the frame 22 and a second end projecting outwardly from the frame 22 for supporting the pusher 48 and facilitating the movement of the pusher 48. Specifically, the first end of the tine 50 is secured to the back panel 30 of the bottom portion 26 of the frame 22 and the second end of the tine 50 projects outwardly from the frame 22 parallel to the lift arms 34. The tine 50 is centered between the lift arms 34 which in turn centers the pusher 48.

Figure 5:
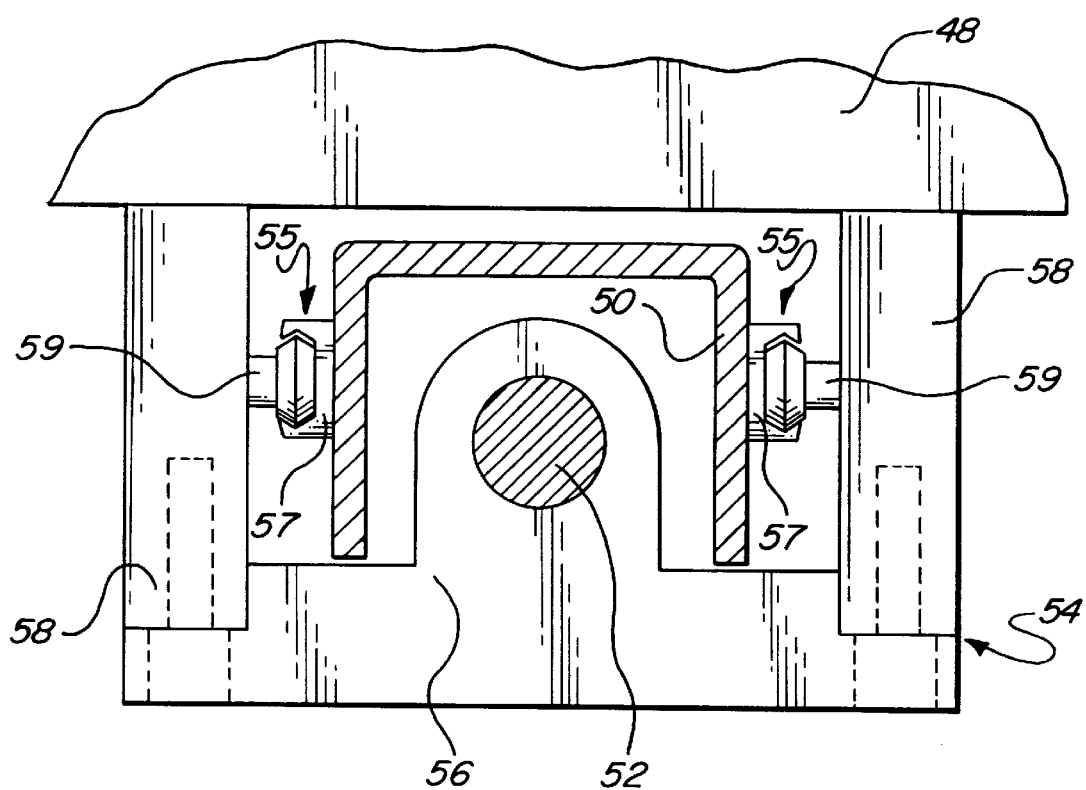
FIG. 5 is an exploded partially cross-sectional view of a drive nut as shown in FIG. 4.

As best shown in FIGS. 3, 4 and 5, a lead screw 52 is rotatably disposed within the hollow tine 50 for controlling the movement of the pusher 48. Preferably, the tine 50 is an inverted U-shaped channel such that the lead screw 52 is exposed on the bottom surface of the tine 50. As appreciated from FIG. 4, the tine 50 is mounted to the back panel 30 slightly lower than the lift arms 34.

A drive nut, generally shown at 54, is secured to the pusher 48 and engages the lead screw 52 for movably mounting the pusher 48 on the lead screw 52 to move the pusher 48 between the first and second ends of the tine 50. Specifically, the drive nut 54 has a threaded portion 56 and a pair of upwardly extending flanges 58. The threaded portion 56 engages the lead screw 52 wherein the drive nut 54 acts as a nut threaded onto a bolt such that stationary turning of the bolt, or lead screw 52, moves the nut longitudinally along the bolt. A bottom surface of the threaded portion 56 is in alignment with the bottom portion 26 of the back panel 30 to again provide a uniform bottom surface for the gripping tool 10. The threaded portion 56 extends outwardly beyond the tine 50 where the flanges 58 are mounted thereto. The flanges 58 extend around the outside and slightly above the tine 50 and are securely fastened to the pusher 48 which in turn secures the pusher 48 to the lead screw 52. The pusher 48 is therefore disposed above the tine 50 and does not directly engage the tine 50 during movement about the tine 50. As appreciated, the drive nut 54 may be of any suitable design. In fact, there may be multiple drive nuts engaging multiple lead screws which are disposed with in multiple hollow tines. The multiple drive nuts could be interconnected to support and drive the pusher.

Referring to FIG. 5, a support track, generally shown at 55, is mounted between the drive nut 54 and the tine 50 for providing support to the pusher 48 during the movement of the pusher 48 between the first and second ends of the tine 50. Preferably, there are two support tracks 55, one mounted on each side of the tine 50. For illustrative purposes, the support tracks 55 are not shown in FIG. 4. Each support track 55 includes a C-shaped rail 57 mounted to each side of the tine 50 which extend along the entire length of the tine 50. Each support track 55 also includes a slider 59 mounted to the interior surfaces of each flange 58. The sliders 59 extend inwardly toward the rails 57 and engage the rails 57 to support the drive nut 54 on the tine 50. As appreciated, the drive nut 54 is also supported on the tine 50 by the lead screw 52. The support tracks 55 ensure that the drive nut 54 and pusher 48 do not pivot about the lead screw 52. Accordingly, the pusher 48 is adequately supported on the gripping tool assembly 10 by the lead screw 52 within the tine 50 and the support tracks 55. Preferably, the sliders 59 also include a plurality of rotatable wheels (not numbered) which engage a slotted surface within the rails 57. This type of support track 55 is known in the art. The support tracks 55 may be of any suitable design so long as the drive nut 54 is adequately supported on the tine 50.

Referring to FIG. 3, the pusher 48 is preferably L-shaped with two substantially flat plates 60, 62 of similar length. A lower flat plate 60 is secured to the flanges 58 and an upper flat plate 62, which is substantially rectangular, extends upward from the lower flat plate 60. The upper flat plate 62 has outer distal ends and is the pushing surface of the pusher 48. Each distal end of the flat plate 62 is disposed above a corresponding lift arm 34 to provide clearance during the movement of the pusher 48. Hence, the pusher 48 is free to move along the gripping tool 10 without restrictive engagement with the tine 50 and lift arms 34. As appreciated by those skilled in the art, the pusher 48 may be of any suitable design or configuration without deviating from the overall scope of the subject invention. For example, the pusher 48 may have notches which positively engage the lift arms 34. As discussed above, there may be more than one tine and more than one drive nut which may change the overall configuration of the pusher.

Referring to FIGS. 3 and 4, a first actuator, generally shown at 64, is at least partially disposed within the bottom portion 26 of the frame 22 for facilitating the rotatable movement of the lead screw 52. The first actuator 64 includes a lead screw pulley 66 and a pusher motor pulley 68 coupled together by a pusher drive belt 70. A pusher drive motor 72 is mounted to the pusher motor pulley 68 for rotatably driving the pusher drive belt 70 to rotate the lead screw 52 and move the pusher 48 about the tine 50. For illustrative purposes, the operative components of the first actuator 64 are shown in phantom in FIG. 4.

A second actuator, generally shown at 74, is at least partially disposed within the top portion 24 of the frame 22 for facilitating the vertical movement of the clamp 38. The second actuator 74 includes a first clamp pulley 76 disposed within the top portion 24 of the frame 22 and a second clamp pulley 78 disposed within the bottom portion 26 of the frame 22 coupled together by a first clamp drive belt 80. A belt fastener 82 secures the clamp 38 to the first clamp drive belt 80 such that the clamp 38 moves upwardly and downwardly in response to the movement of the first clamp drive belt 80. The belt fastener 82 is preferably a pair of plates extending from the clamp 38 which bolt to the first clamp drive belt 80. The second actuator 74 also includes a third clamp pulley 84 disposed within the bottom portion 26 of the frame 22 and a clamp motor pulley 86 coupled together by a second clamp drive belt 88. A clamp drive motor 90 is mounted to the clamp motor pulley 86 for rotatably driving the second clamp drive belt 88 to rotate the third clamp pulley 84. The clamp drive motor 90 has an internal brake (not shown) to maintain the position of the clamp 38 in the event of a power failure. The internal brake precludes the object being "thrown" in the event of a sudden emergency stop of the robot 14. For additional safety, an external brake may also be installed on the clamp drive motor 90.

The third clamp pulley 84 and the second clamp pulley 78 are rotatably secured to a common shaft 92 such that rotation of the clamp drive motor 90 causes movement of the first clamp drive belt 80 which moves the clamp 38 upwardly and downwardly within the channels 40. As appreciated from FIG. 4, rotation of the clamp motor pulley 86 in a counter-clockwise direction will move the clamp 38 downward and rotation of the clamp motor pulley 86 in a clockwise direction will move the clamp 38 upward. Preferably, the third clamp pulley 84 has a larger diameter than the second clamp pulley 78, thereby increasing the operating speed of the first clamp drive belt 80.

The pulleys 66, 68, 76, 78, 84, 86 and belts 70, 80 of the first 64 and second 74 actuators can be of any suitable design or configuration as is well known in the art. Similarly, the drive motors 72, 90 of the clamp 38 and pusher 48 can be of any desired size and type of servo-motor depending upon the desired application of the gripping tool assembly 10. The servo-motor chosen must have the requisite ability to accurately control motor speed and rotational position and the ability to hold a desired position.

A feedback control mechanism, shown schematically at 94, is connected to the clamp drive motor 90 for controlling the operating speed, position and torque of the clamp drive motor 90 and the speed, position, and downward gripping force of the clamp 38. In other words, as the clamp 38 moves downward and engages the object the resistance in the clamp drive motor 90 will increase. The feedback control mechanism 94 senses this increased resistance and stops the clamp drive motor 90 when a predetermined level of resistance has been reached. This is known as the predetermined clamping force. The internal brake of the clamp 38 is set once the predetermined clamping force is reached. The clamp 38 of the gripping tool assembly 10 does not have to be programmed to grip a certain size object. The downward movement of the clamp 38 automatically adjusts to accommodate different sized objects. As can be appreciated, this is very useful during the transportation of numerous boxes wherein the boxes may be of different sizes.

Similarly, a feedback control mechanism (not numbered) may be connected to the pusher drive motor 72 for controlling the operating speed, rotational position and torque of the pusher drive motor 72. The feedback control mechanism would control the position and speed of the pusher 48. The feedback control mechanism of the pusher 48 is substantially identical and operates in substantially the same manner as the feedback control mechanism 94 of the clamp 38.

During the operation of the gripping tool assembly 10, the robot 14, or other suitable manipulator, will move the gripper tool assembly 10 into position near the object, e.g., the pick-up zone. In the preferred embodiment as shown, the two lift arms 34 will slide under the box. As appreciated, the pusher 48 is initially moved to a retracted position near the back panel 30. As the gripper tool 10 moves upwardly the lift arms 34 begin to lift the box. Simultaneously, the clamp 38 moves downward, via the second actuator 74, until the feedback control mechanism 94 determines that the predetermined clamping force has been obtained. The box is now sandwiched between the clamp 38 and the lift arms 34. The pusher 48 may then move to a position abutting the box to provide additional support. The robot 14 and gripping tool assembly 10 then transport the box to the desired location, e.g., the drop-off zone. The gripping tool assembly 10 is moved into position near a drop off point. The clamp 38 is raised and the pusher 48 simultaneously pushes the box off of the lift arms 34. As appreciated, the pusher 48 is moved by the drive nut 54, lead screw 52 and first actuator 64. The robot arm 12 and gripping tool 10 may also simultaneously move backward while advancing the pusher 48 forward to increase the unloading speed and efficiency. In fact, the frame 22 and lift arms 34 may retract while the pusher 48 simultaneously advances toward the second end of the lift arms 34 in such a manner as to cause the object to drop vertically. The robot 14 and gripping tool assembly 10 are now returned to the pick-up zone and the above described process is repeated.

As appreciated, the drop-off zone may be at different heights and accessibilities. Therefore, in some instances the gripping tool assembly 10 can tilt downward to allow gravity to assist in the unloading while in other instances the gripping tool 10 can only align parallel or must tilt upward with respect to the drop-off zone. Hence, the pusher 48 may work in conjunction with gravity or may have to push the box without or even against the benefit of gravity assistance. In any event, the control and assurance associated with unloading the object is dramatically increased by the use of the pusher 48.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A gripping tool assembly for gripping and moving objects, said assembly comprising:

a frame having a top portion and a bottom portion;

at least one lift arm having a first end secured to said bottom portion of said frame and a second end projecting outwardly from said frame for supporting the object;

a clamp movably mounted to said frame for vertical movement between said top and bottom portions relative to said lift arm to sandwich the object between said clamp and said lift arm;

a pusher movably mounted to said frame for horizontal movement relative to said lift arm to push the object toward said second end of said lift arm; and a hollow tine having a first end secured to said bottom portion of said frame and a second end projecting outwardly from said frame parallel to said lift arm to guide and support said pusher and facilitate said movement of said pusher adjacent said lift arm.

2. An assembly as set forth in claim 1 further including a lead screw rotatably disposed within said tine for controlling said movement of said pusher.

3. An assembly as set forth in claim 2 further including a drive nut secured to said pusher and engaging said lead screw for movably mounting said pusher on said lead screw to move said pusher between said first and second ends of said tine.

4. An assembly as set forth in claim 3 further including a support track mounted between said drive nut and said tine for providing support to said pusher during said movement of said pusher between said first and second ends of said tine.

5. An assembly as set forth in claim 3 further including a pair of lift arms extending outwardly from said bottom portion of said frame parallel to said tine with said tine disposed between said lift arms.

6. An assembly as set forth in claim 5 wherein said pusher includes a substantially flat plate having outer distal ends.

7. An assembly as set forth in claim 6 wherein said outer distal ends of said plate are disposed above a corresponding lift arm to provide clearance during said movement of said pusher.

8. An assembly as set forth in claim 2 further including a first actuator at least partially disposed within said bottom portion of said frame for facilitating said rotatable movement of said lead screw.

9. An assembly as set forth in claim 8 wherein said first actuator includes a lead screw pulley and a pusher motor pulley coupled together by a pusher drive belt.

10. An assembly as set forth in claim 9 further including a pusher drive motor mounted to said pusher motor pulley for rotatably driving said pusher drive belt to rotate said drive screw and move said pusher about said tine.

11. An assembly as set forth in claim 10 further including a feedback control mechanism connected to said pusher drive motor for controlling the operating torque and rotational position of said pusher drive motor.

12. An assembly as set forth in claim 1 further including channels mounted to said frame for vertically guiding said clamp upwardly and downwardly between said top and bottom portions of said frame.

13. An assembly as set forth in claim 12 wherein said clamp is a substantially rectangular plate.

14. An assembly as set forth in claim 12 wherein said clamp includes a mashing plate for assisting in gripping the object when the object is sandwiched between said clamp and said lift arm.

15. An assembly as set forth in claim 12 further including a second actuator at least partially disposed within said top portion of said frame for facilitating said vertical movement of said clamp.

16. An assembly as set forth in claim 15 wherein said second actuator includes a first clamp pulley disposed within said top portion of said frame and a second clamp pulley disposed within said bottom portion of said frame coupled together by a first clamp drive belt.

17. An assembly as set forth in claim 16 wherein said second actuator further includes a belt fastener for securing said clamp to said first clamp drive belt such that said clamp moves upwardly and downwardly in response to said movement of said first clamp drive belt.

18. An assembly as set forth in claim 17 wherein said second actuator includes a third clamp pulley disposed within said bottom portion of said frame and a clamp motor pulley coupled together by a second clamp drive belt.

19. An assembly as set forth in claim 18 further including a clamp drive motor mounted to said clamp motor pulley for rotatably driving said second clamp drive belt to rotate said third clamp pulley.

20. An assembly as set forth in claim 19 wherein said third clamp pulley and said second clamp pulley are rotatably secured to a common shaft such that rotation of said clamp drive motor causes movement of said first clamp drive belt which moves said clamp upwardly and downwardly along said channels.

21. An assembly as set forth in claim 20 wherein said third clamp pulley has a larger diameter than said second clamp pulley, thereby increasing the operating speed of said first clamp drive belt.

22. An assembly as set forth in claim 20 further including a feedback control mechanism connected to said clamp drive motor for controlling the operating torque and rotational speed of the clamp drive motor and the downward gripping force of the clamp.

\* \* \* \* \*